Figure 1:
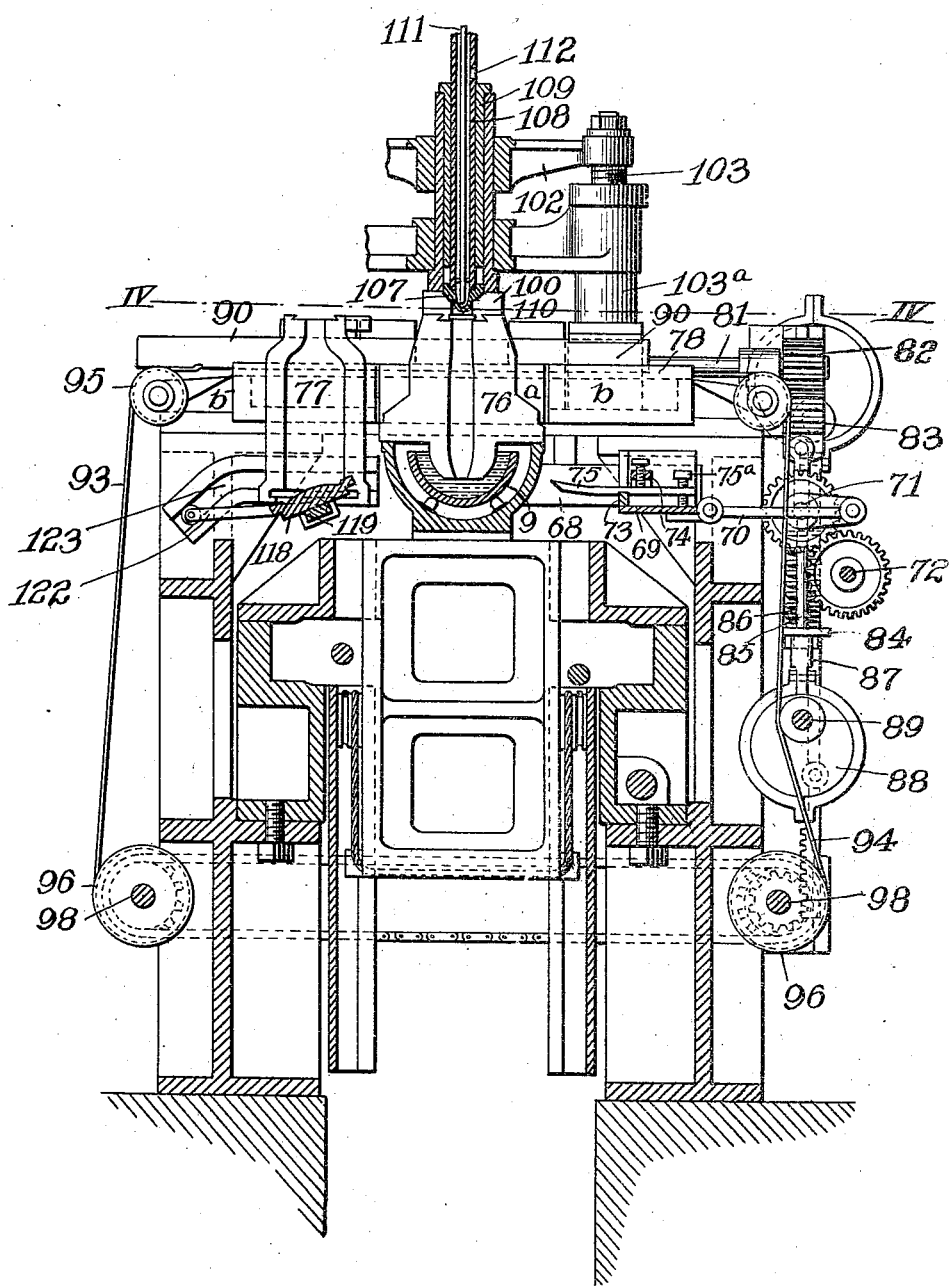

C. C. STUTZ.
MANUFACTURE OF GLASS ARTICLES.
APPLICATION FILED JULY 19, 1911.

1,007,252.

Patented Oct. 31, 1911.

4 SHEETS—SHEET 1.

WITNESSES:
J. Herbert Bradley.
Thomas Joyce

INVENTOR
Charles C. Stutz
by Dennis L. Wolcott
Atty

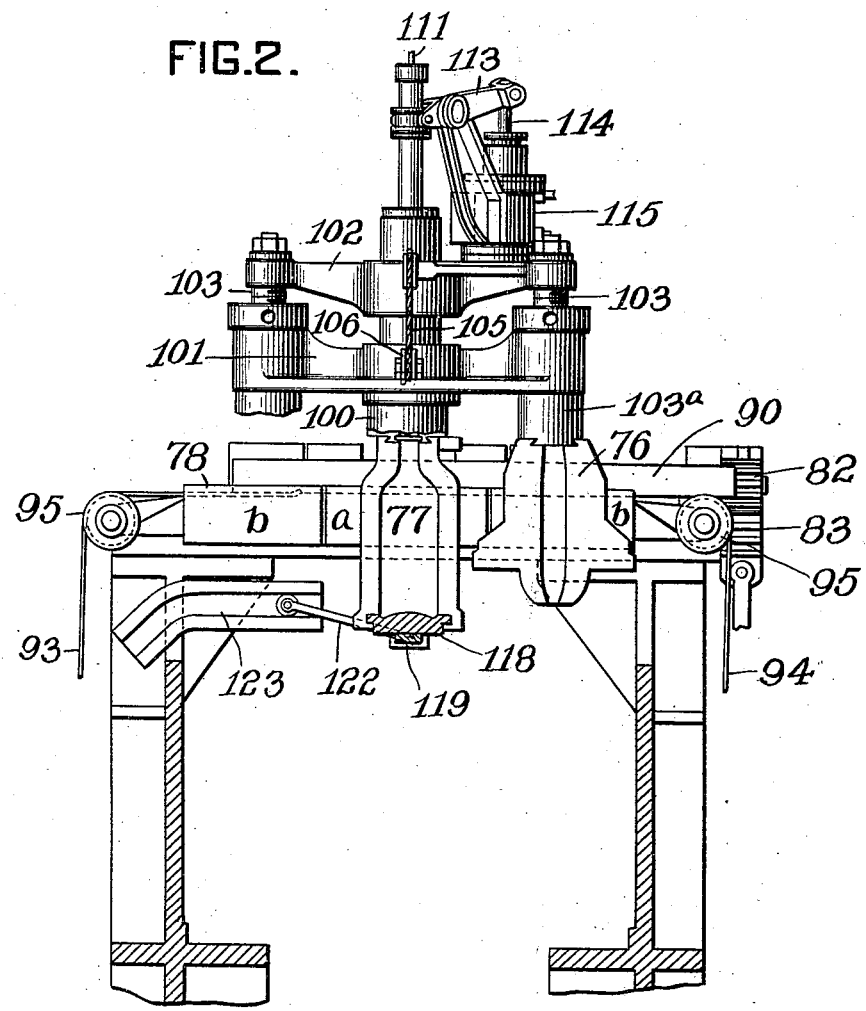

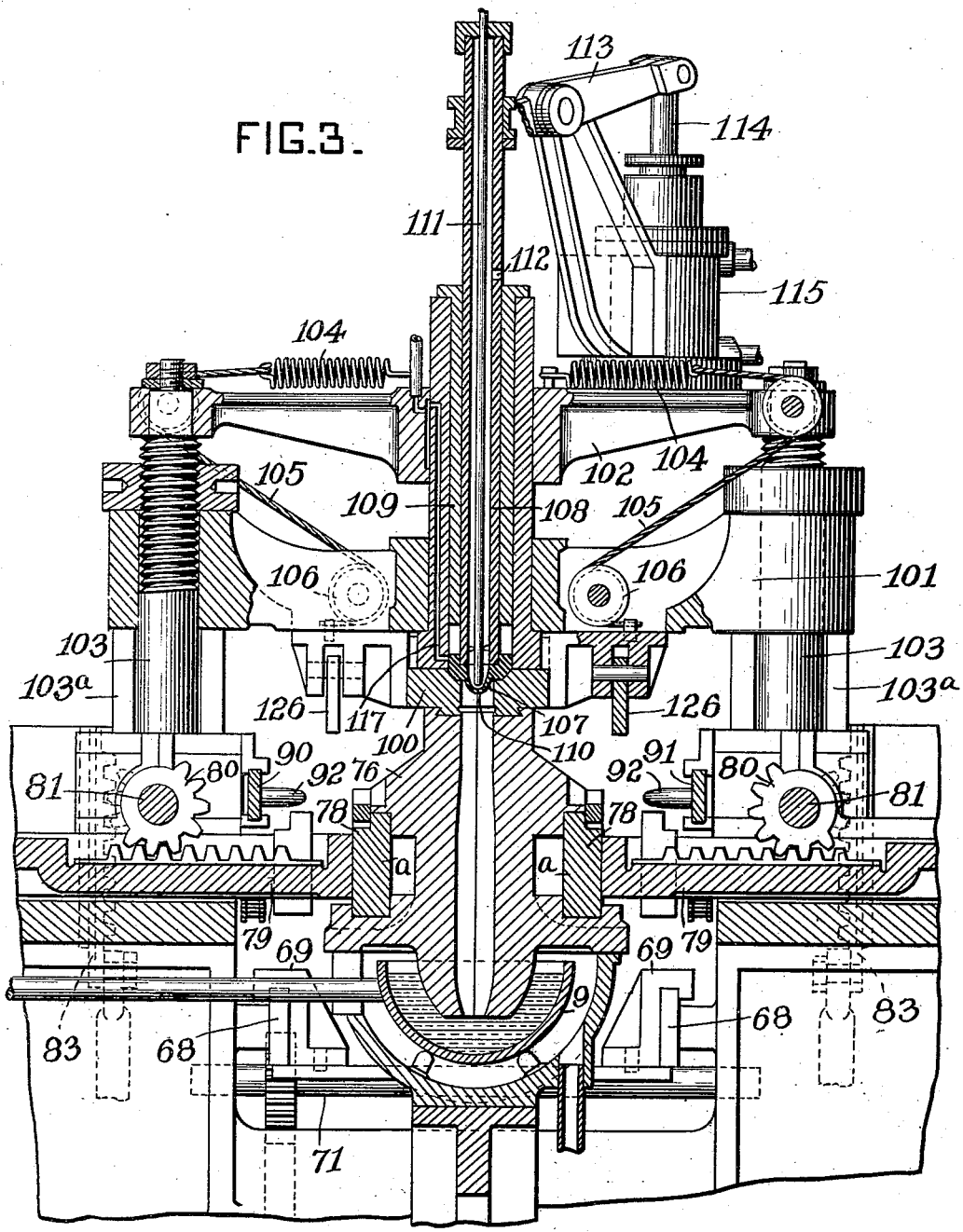

C. C. STUTZ.
MANUFACTURE OF GLASS ARTICLES.
APPLICATION FILED JULY 19, 1911.
1,007,252.
Patented Oct. 31, 1911.
4 SHEETS—SHEET 4.
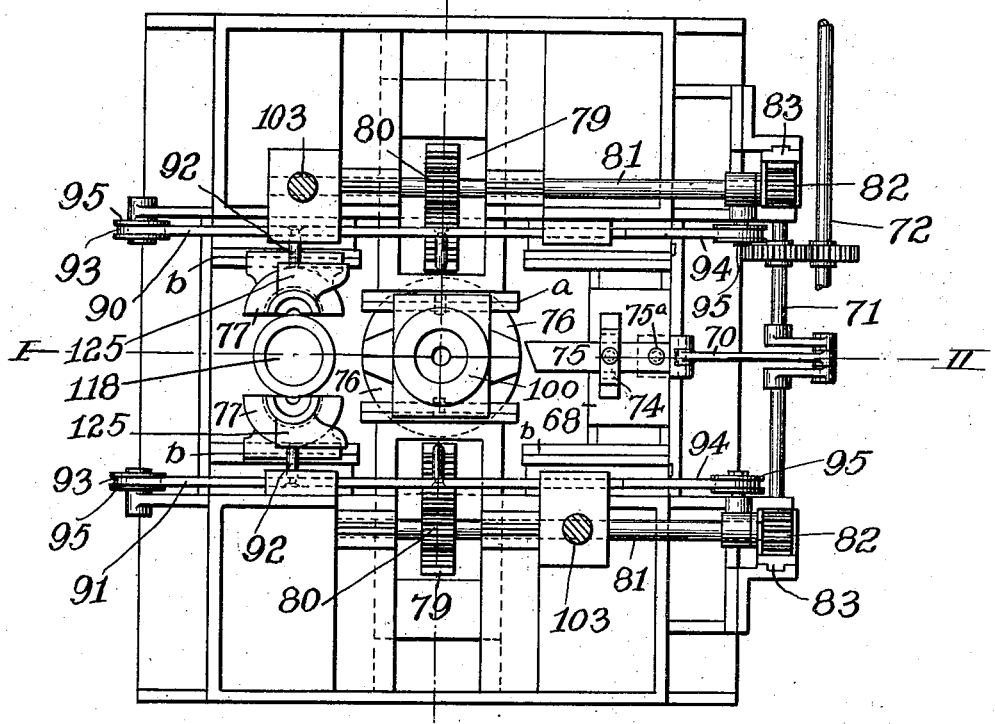
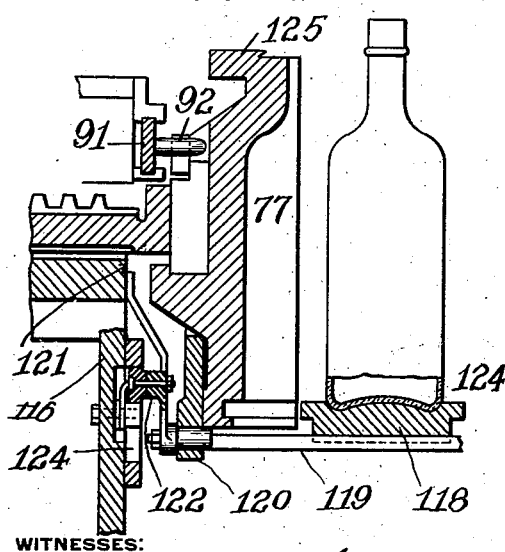
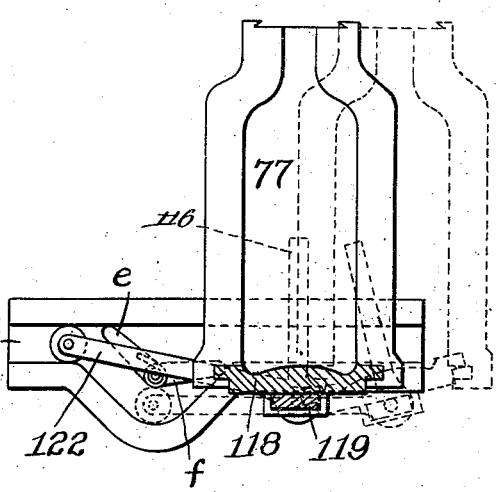
WITNESSES:
J. Herbert Bradley
Thomas Joyce
INVENTOR
Charles C. Stutz
by Daniel C. Wolcott
Atty

UNITED STATES PATENT OFFICE.

CHARLES C. STUTZ, OF NORWOOD, OHIO.

MANUFACTURE OF GLASS ARTICLES.

1,007,252.      Specification of Letters Patent.    Patented Oct. 31, 1911.

Original application filed July 12, 1911, Serial No. 632,735. Divided and this application filed July 19, 1911. Serial No. 639,459.

*To all whom it may concern:*

Be it known that I, CHARLES C. STUTZ, residing at Norwood, in the county of Hamilton and State of Ohio, a citizen of the United States, have invented or discovered certain new and useful Improvements in Manufacture of Glass Articles, of which improvements the following is a specification.

In an application filed by me July 12th, 1911, Serial No. 632735, of which this application is a division, is described and claimed mechanism for transferring molten glass from a receptacle to a mold or series of molds and also for charging the mold or molds from the glass so transferred.

The invention described herein relates to the combination and arrangement of blank and blow molds or a series of such molds with mechanism for shifting and opening and closing such molds.

While preferring to employ the glass transferring and feeding mechanism as set forth in the application referred to, it will be understood that other glass charging or feeding means may be employed in connection with the molds and mechanism described and claimed herein.

In the accompanying drawings forming a part of this specification Figures 1 and 2 are sectional elevations, the upper portions being on a plane indicated by the line I—II Fig. 4, Fig. 1 showing the blank mold in glass receiving position; Fig. 2 showing the blow mold in blowing position; Fig. 3 is a sectional elevation on a plane indicated by the line III—III Fig. 4 showing the blank mold in receiving position; Fig. 4 is a sectional plan view on a plane indicated by the line IV—IV Fig. 1; Figs. 5 and 6 are detail views illustrating a modification of the means employed for tilting the bottom of the blow mold.

In the practice of my invention it is preferred that the glass be conveyed from a suitable receptacle to the blank mold by a ladle 9 in the manner shown and described in application Serial No. 632735 but other suitable means may be employed for charging this mold.

The blank mold 76 and blow mold 77 are formed in two vertical sections which are movably mounted on rails 78 arranged above and at right angles to direction of movement of the ladle. Each rail consists of stationary end section $b$ and laterally movable middle section $a$ as shown in Figs. 1, 2, 3, and 4. The middle sections $a$ of the rails are attached to slides 79 movable in opposite directions. These slides may be shifted by any suitable means, as for example pinions 80 intermeshing with the teeth on the slides, said pinions being secured on the shafts 81 to which are secured pinions 82 intermeshing with racks 83. These racks have their lower ends attached to movable plates 84 mounted on rods 85 and are held in normal positions by springs 86. The lower ends of the rods are connected by cross heads 87 to the straps of eccentrics 88 on the driven shaft 89 as shown in Fig. 1. The end sections $b$ of the rails are arranged a distance apart proportional to the desired separation of the mold sections necessary for removing the mold section from around the blank and finished article respectively as shown in Figs. 3 and 4.

As the formation of the blank and the blowing of the latter are effected in the respective molds when carried by the movable rail sections $a$ provision is made for shifting one mold from and the other mold onto said rails sections. The movements are preferably effected simultaneously, and while any suitable means may be employed for that purpose the construction shown in Figs. 1, 2, 3, and 4 is well adapted therefor. Sliding bars 90 and 91 are mounted on any suitable bearing parallel with the rails 78 and are so arranged relative to the opening movement of the mold sections, that when the latter are moved outwardly by the slides 79, they will engage the bars 90 and 91 in any suitable manner, and when so engaged the sections of the blank mold will be tied to the corresponding sections of the blow mold. This engagement may be effected by pins 92 on the bars or tie rods entering holes formed in the mold as shown. Bands 93 and 94 are connected to the ends of these bars or tie rods and extend over guide pulleys 95 to drums 96 on the driven shafts 98 as shown in Figs. 1 and 2. By oppositely rotating these shafts the molds can be shifted, one from and the other into operative position and by reversing the shafts the positions of the molds can be changed.

The neck mold 100 is formed in two sections which are so mounted in guides on the under side of the lower bridge 101 as to be movable toward and from each other as hereinafter described. The bridge 101 as also the upper bridge 102 are supported on uprights 103, the lower bridge which carries the neck mold being adjustable on the uprights so as to permit of the use of molds of different heights. The neck molds are normally held in closed position by springs 104 connected to the respective mold sections by bands or cords 105 which pass over guide pulleys 106 as shown in Fig. 3. As shown, the lower portions of the neck molds are engaged by both the blank and blow molds and are thereby held in closed position during the formation of the blank and blowing of the latter. The upper end of the opening of the neck mold is closed by the plug 107 on the lower end of the hollow plunger 108 which is guided in its movement by sleeves 109 carried by the upper and lower bridges. The lower end of the plug is provided with a teat 110 for forming an initial opening in the upper end of the blank. The plug plunger, etc., are kept cool by a fluid entering through the pipe 111 and escaping through a port 112.

The plunger is connected by a lever 113 to the piston rod 114 of a fluid pressure cylinder 115 carried by the upper bridge 102. After the formation of the blank the sections of the mold are separated by shifting the intermediate sections $a$ of the rails 78 outwardly into line with the stationary end sections $b$ on one of which the blow mold sections are carried. This separation of the blank mold sections leaves the blank suspended from the neck mold in the same position in which it was formed. When the blank mold sections are moved outwardly they engage one end of the bars 90 and 91, the opposite ends of which are at that time in engagement with the blow mold sections. The shafts 98 are now operated to shift the blank mold from and the blow mold onto the movable rail sections $a$ which are then moved inwardly closing the blow mold sections around the blank, the lower portion of the neck mold and the bottom of the mold. While the blank is suspended from the neck mold, it is preferred that a sufficient puff of air be admitted into the lower end of the tubular guide 109 through a port 117 to enlarge the initial opening formed in the upper end of the blank by the teat 110, the plunger having been raised at about the time the blank mold sections were separated by the admission of fluid pressure into the cylinder 115, to uncover the port 117 and permit the air to enter the neck mold.

The bottom 118 of the blow mold is carried by the bar 119 slidably supported in lugs 120 attached to the mold sections as shown in Figs. 5 and 6. In order to hold the bottom central during the movement of the sections, springs 116 are secured to the bar 119 the springs being so constructed as to bear against surfaces 121 of the machine as shown in Fig. 5. The bottom 118 is normally held in horizontal position by an arm 122 secured to the bar 19 and provided with a pin or roller projecting into a guide groove 123, as shown in Figs. 1 and 2. The guide groove is provided with an angular portion which will shift the arm and bottom of the blow mold thereby causing the bottle to tilt and drop off the bottom as the blow-mold reaches its position on the end sections $b$ of the rail 78. In Figs. 5 and 6 is shown a modification of the bottom tilting means permitting the bottle to remain on the bottom and cool until the blow mold is moved to central position for the blowing of the next blank. The guide groove 124 is provided with a V shaped depression in which is located a two armed switch. This switch is normally held by a spring with one arm $e$ in such position that when the blow mold is moving from central position the pin on the arm 122 will pass over the part $e$ holding the bottom horizontally. When the mold is returned to central position the pin on the arm 122 will be deflected down into the V shaped depression by the part $f$ turning the bottom so that the bottle will drop off. After the blow mold has been closed as stated sufficient air under pressure is admitted through port 117 to fully expand the blank. After blowing has been completed the slides 79 are shifted moving the blow mold sections apart and bringing the rail sections $a$ into alinement with the end sections $b$. In their movement apart projections 125 on the blow mold sections strike against fingers 126 pivotally mounted on the neck mold sections and move the latter apart, thus leaving the completed article entirely free and resting on the bottom 118 as shown in Fig. 5. The shafts 98 are now operated to shift the blow and blank mold sections the latter into central or operative position. As the blow mold sections move away from central position the projections 125 pass away from the fingers 126 permitting the neck mold sections to be closed together by their springs 104. By reference to Fig. 4 it will be noticed that the projections 125 are made of such length that neck mold sections will not be free to be moved by the springs until the bottle has been moved sufficiently far by the bottom of the blow mold to be entirely clear of the neck molds when snapped shut by their springs. The shaft 72 is now operated in reverse direction to shift the blank mold sections together and around the lower ends of the neck mold sections.

When employing the method of charging the blank mold described and shown in said application the ladle is raised until the lower end of the blank mold is immersed in the molten glass a portion of which is caused to flow up and fill the blank mold. The ladle is then lowered and the glass in the mold severed from that remaining in the ladle. While any suitable means may be employed for thus severing the glass, that shown is suitable.

Rails 68 are secured to the side plates of the machine in a suitable relation to the blank mold, and on these rails is mounted the knife carriage 69, connected by the link 70 to a crank arm preferably secured on the countershaft 71 which is driven at suitable intervals by the shaft 72 as shown in Figs. 1 and 2. The carriage is provided with an abutment 73 and a strap 74 through the top of which passes a set screw. The blade 75 which is provided at its rear end with an adjusting screw $75^a$ is passed under the strap and over the abutment which serves as a pivotal support for the blade. By means of the screws the front end of the blade can be closely adjusted so that when the carriage is reciprocated the blade will move along in contact with the lower end of the blank mold making a clean cut through the glass. As will be readily seen by reference to Fig. 1 the blade can be easily removed by loosening the screw in the strap 74.

The shafts 72, 89 and 98 may be driven in any suitable manner as will suggest itself to one skilled in the art, but preferably in the manner shown and described in the application referred to. The shafts 98 should be driven simultaneously but in opposite directions.

It will be readily understood that the blank and blow mold and neck molds can be easily and quickly removed and other molds substituted without changing the adjustment of any of the other parts of the machine except the bridge 101 carrying the neck molds and the plunger for closing the upper end of the latter, when the substituted molds vary in length from those removed. The adjustment of the bridge is effected by replacing the U shaped collars $103^a$ on the upright 103. It will be observed that those parts whose movements would vary with different sizes of molds, are actuated by mechanisms having springs or cushions in their connections and hence by adjusting the actuating mechanisms to give the greatest movement likely to be needed the springs will yield and compensate for lesser movements.

As will be readily understood by those skilled in the art any shifting of the blank while hanging from the neck mold free and laterally unsupported will tend to bend the upper portion of the still plastic blank. This distortion will not occur in my improved machine as the blank is not moved in any direction but is blown and shaped in the place it was formed.

It will be understood that as regards the broad features c claimed as of the invention herein, the mechanisms shown and described are merely types and that such mechanisms can be readily changed and modified within wide limits by one skilled in the art without departing from the spirit of the invention.

I claim herein as my invention:

1. In a machine for the manufacture of glass articles, the combination of a relatively stationary neck mold and blowing means connected thereto, and blank and blowing molds, movable into operative relation relative thereto.

2. In a machine for the manufacture of glass articles, the combination of a neck mold, a blank mold, a blow mold and means for simultaneously shifting said blank and blow molds one into the other away from operative relation to the neck mold.

3. In a machine for the manufacture of glass articles, the combination of a neck mold, a blank mold, a blow mold, means for shifting said blank and blow molds alternately into operative relation to the neck mold and means for opening and closing the sections of said molds.

4. In a machine for the manufacture of glass articles, the combination of rails having intermediate movable sections, a mold having its sections movably mounted on said rails and means for moving the intermediate rail sections into and out of alinement with the other sections.

5. In a machine for the manufacture of glass articles, the combination of rails having movable intermediate sections, a mold having its sections mounted on said rails, means for shifting the mold along the rails and means for moving the intermediate rail sections into and out of alinement with the end sections.

6. In a machine for the manufacture of glass articles, the combination of rails having movable intermediate sections, molds having their sections mounted on said rails, means for simultaneously shifting said mold sections along the rails, and means for moving the intermediate rail sections out of and into alinement with the end sections.

7. In a machine for the manufacture of glass articles, the combination of a sectional neck mold, a blank mold, a blow mold, means for moving the sections of said blank and blow molds into alinement with the neck mold, means for closing the mold sections around and moving them away from the neck mold, and means operative by the blow mold to open the sections of the neck mold.

8. In a machine for the manufacture of glass articles, the combination of a sectional neck mold, means for closing said sections, a body shaping mold formed in sections, means for opening and closing said sections and means operative by said body mold sections during their opening movements to shift the neck mold sections.

9. In a machine for the manufacture of glass articles, the combination of a sectional neck mold, resilient means for closing said sections, body shaping mold sections adapted to engage the neck mold sections when separated, means for opening and closing said body mold sections and means for shifting the body mold sections out of engagement with the neck mold sections.

10. In a machine for the manufacture of glass articles, the combination of a mold formed in sections, a movable bottom for said mold, means for opening the sections of the mold, and means for shifting the bottom of the mold.

11. In a machine for the manufacture of glass articles, the combination of a mold formed in sections, a movable bottom for said mold, means for separating the mold sections, means for shifting the mold sections and bottom to and from glass shaping position and means for tilting the bottom of the mold during such movement.

12. In a machine for the manufacture of glass articles, the combination of a sectional mold having a movable bottom, means for separating the mold sections, means for moving the mold and bottom from and to glass shaping position, and means for tilting the bottom while the mold is being moved to glass shaping position.

13. In a machine for the manufacture of glass articles, the combination of sectional blank and blowing molds, a neck mold, means for opening and closing the blank and blowing molds, means for shifting the blank and blowing molds alternately into operative relation to the neck mold, the mechanisms for operating said blank and blowing molds being automatically adjustable to impart the necessary movements to molds varying in dimensions.

In testimony whereof, I have hereunto set my hand.

CHARLES C. STUTZ.

Witnesses:
 ALICE A. TRILL,
 THOMAS JOYCE.

Copies of this patent may be obtained for five cents each, by addressing the "Commissioner of Patents, Washington, D. C."